3,315,062
STUD WELDING SYSTEM
Charles C. Pease, Pennsauken, N.J., assignor to KSM Products, Inc., Moorestown, N.J., a corporation of New Jersey
Filed June 28, 1963, Ser. No. 291,530
5 Claims. (Cl. 219—113)

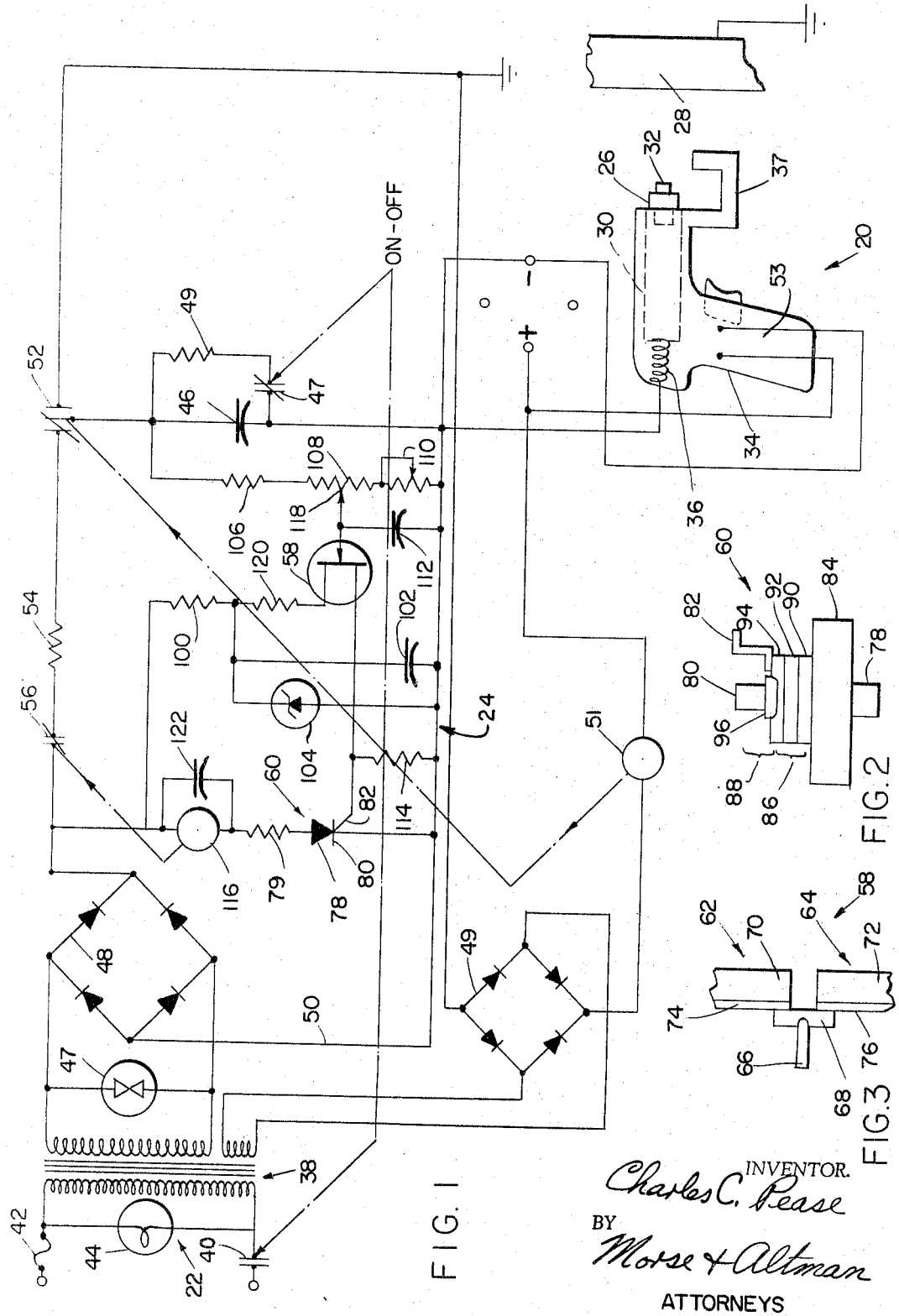

The present invention relates to electric welding and, more particularly to stud welding devices for joining one end of an axially elongated stud to the surface of a laterally extended workpiece for any of a variety of purposes. For example, the outer end of stud may be threaded to permit desired components to be fastened to the workpiece after the stud has been welded thereto.

A variety of electrical systems have been proposed for stud welding devices of the foregoing type. In one such system, the stud is biased toward the workpiece and power is supplied to the contiguous portions of the stud and the workpiece from a storage capacitor which has been charged by a suitable power source. Here the stud may be provided with a projection which is biased into pressure contact with the workpiece in such a way that discharge of the power source through the stud projection and the workpiece results in disintegration of the projection, heating of the contiguous portions of the stud and the workpiece to welding temperature and diffusion bonding of the portions together under the applied pressure. In the past, problems have been encountered in regulating the voltage associated with the welding current, adjusting this voltage as desired within a predetermined range and repeating the welding cycle frequently within a relatively short period of time.

Primary objects of the present invention are to provide a stud welding system of the foregoing type in which a gating rectifier and unijunction transistor coact in a novel sensing circuit to interrupt the charging circuit when the voltage across the storage capacitor reaches a predetermined value; in which a single adjustable element at a novel location in the sensing circuit enables sharp selection of desired voltage in the storage capacitor; in which charging of the storage capacitor is effected under novel conditions through a full wave rectifier by which repetitive charging of the storage capacitor can occur rapidly; and in which all of the foregoing novel features coact together to provide a welding circuit characterized by an unusual combination of simplicity and efficacy.

Other objects of the present invention will in part be obvious and will in part appear hereinafter.

The invention accordingly comprises the apparatus comprising the construction, combination of elements and arrangements of parts, which are exemplified in the following detailed disclosure, the scope of which will be indicated in the appended claims.

For a fuller understanding of the nature and objects of the present invention, reference should be had to the following detailed description, taken in connection with the accompanying drawing wherein:

FIG. 1 is a schematic diagram of a stud welding system embodying the present invention;

FIG. 2 is an exaggerated cross-sectional view of a gating rectifier useful in the system of FIG. 1; and FIG. 3 is an exaggerated cross-sectional view of a unijunction transistor useful in the system of FIG. 1.

Generally, the illustrated system includes a stud welding gun 20, a power supply 22 and a control circuit 24. In the following description, first gun 20 will be described in conjunction with a stud 26 and a workpiece 28. Next power supply 22 will be described. Next the specific unijunction transistor and gating rectifier utilized in control circuit 24 will be described in detail. Finally control circuit 24 will be described in relation to gun 20 and power supply 22.

As shown, gun 20 includes a chuck 30 for holding stud 26, the end of which is shown as being provided with a projection 32. Chuck 30 is reciprocable within a housing 34 of gun 20, being biased into its most outward position by a spring 36. The chuck is so designed as to be forced into housing 34 when the gun is manually directed against the work. Inward movement of the chuck is limited by a stop 37 which is affixed to housing 34 and bears against workpiece 28. When a welding current is passed through stud 26, projection 32 and workpiece 28, projection 32 disintegrates in a manner known to the art and stud 26 is directed under the bias of spring 36 into contact with workpiece 28 at a time when the contiguous portions of the stud and the workpiece have been heated to welding temperature by the welding current.

Power supply 22 for the system includes a transformer 38 across a suitable A.C. supply. The primary of transformer 38 is in series with a suitable on-off switch 40 and a fuse 42. Shunted across the primary of transformer 38 is a suitable pilot light 44. Basically power supply 22, under the control of control circuit 24, charges a storage capacitor 46 as follows. A secondary of transformer 38 is applied across a Thyrector diode 47 and a bridge 48. Thyrector diode serves to filter out high voltage transients that might be harmful to bridge 48. Bridge 48 provides rectified current for use as described below. Charging current flows from the negative terminal of rectifier 48 through lead 50, through storage capacitor 46, through normally closed points 52 and a series resistor 54, through normally closed points 56 and back to the positive terminal of rectifier 48. A secondary of transformer 38 also is applied across a bridge 49 that energizes a relay 51 for opening and closing single pole, double throw points 52 when a trigger 53 is closed and stud 26 is in contact with workpiece 28.

Without a means for opening normally closed points 56, storage capacitor 46 would charge to the peak of the applied wave form. The remainder of control system 24, now to be described, incorporates a solid state arrangement for sensing the storage capacitor voltage in order to open the charging circuit when the voltage reaches a selected value. Control system includes a unijunction transistor 58 and a silicon controlled rectifier 60, the operation and interaction of which will be discussed below. Details of the specific structure of these elements, which will contribute to a full understanding of the present embodiment, now will be described.

Unijunction transistor 58 is shown in FIG. 3 as having two base terminals 62 and 64 and an emitter 66, being designed to generate a sharp pulse when a voltage is applied between the emitter and one of the base terminals at a value that is approximately one-half the voltage between the two base terminals. When this voltage is reached, the unijunction transistor fires, at which time heavy conduction occurs between the emitter and one of the base terminals. As shown, unijunction transistor 58 includes an N type silicon bar 68. To one face of silicon bar 68 are connected ceramic ohmic base contacts 70 and 72 by discrete gold strata 74 and 76. Single P type emitter 66, composed for example of aluminum, is fused to the other face of bar 68 at a junction that is located closer to one base than to the other so that the device is not symmetrical. In normal operation of the unijunction transistor, a positive bias is applied across base 74 and base 76. This bias is applied to establish a current and an electric field within silicon bar 68 and produces a voltage on the N side of the emitter junction. This voltage is a function $n$ of the applied interbase voltage $V_{BB}$. The function $n$ is termed the intrinsic standoff ratio. If the applied emitter voltage $V_E$ is smaller than $V_{BB}$, the emitter junction will be reversely biased and only a small leakage current will flow in the emitter circuit. If $V_E$ exceeds $nV_{BB}$ by an amount equal to the forward voltage drop of the emitter diode, the emitter current will increase. Essentially, the path between emitter 66 and base 64 becomes highly conductive as compared to its prior state. If the source of emitter voltage $V_E$ is a capacitor, this capacitor will discharge through this conductive path to produce a pulse.

Generally, as shown in FIG. 2, silicon controlled rectifier 60 is similar to an ordinary rectifier which conducts only in the forward direction from an anode 78 to a cathode 80. However, in silicon controlled rectifier 60, a block occurs in the forward direction also until a small voltage, known as the firing voltage is applied to a gate 82. Thereafter, conduction continues, even though the gate current is stopped, until the anode to cathode current is decreased below a given minimum, known as the holding current. Between anode 78 and cathode 80, in sequence, are a support 84, a PNP assemblage 86 and a PN assemblage 88. PNP assemblage 86 consists of silicon strata 90, 92 and 94. PN assemblage 88 consists of silicon stratum 94 and gold-antimony stratum 96. Gate lead 82 is connected to stratum 94. In essence, gating rectifier 60 is a PNPN unit with a gate lead connected to the inner P stratum. In operation, the voltage between the gate and the cathode must be above a predetermined minimum before conduction will occur. After conduction occurs, the current will continue even if the gate voltage is removed until the current decreases below a predetermined minimum at which time the silicon controlled rectifier returns to the forward blocking state with the gate open.

Control circuit 24 comprises the following components and undergoes the following operation, being energized as indicated above by power supply 22. A resistor 100, a capacitor 102 and a zener diode 104 supply a regulated and filtered DC voltage across the two bases of unijunction transistor 58. A resistor 106, a potentiometer 108 and a variable resistor 110 constitute a voltage divider network which is connected across welding storage capacitor 46, a portion of the voltage across welding storage capacitor 46 serving to charge a capacitor 112. When capacitor 112 reaches a voltage equal to the firing point of unijunction transistor 58, a pulse will be produced across a resistor 114, which is connected between the gate 82 and cathode 80 of silicon controlled rectifier 60. Anode 78 of silicon controlled rectifier 60 is fed through a current limiting resistor 79. Silicon controlled rectifier thereby is caused to conduct. In turn, relay 116 is energized in order to open normally closed points 56. In consequence, charging of storage capacitor 46 ceases.

In the foregoing circuit, maximum permissible storage capacity is controlled by potentiometer 110. Welding voltage below this permissible maximum is achieved by the adjustment of movable terminal 118 of potentiometer 108. With the aid of zener diode 104 the desired storage capacitor voltage by potentiometer 108 is maintained constant no matter what variations occur in power supply 22. The function of zener diode 104 is to keep the voltages of the two bases of unijunction transistor 58 constant. A resistor 120 serves to compensate for temperature effects in the unijunction transistor. If no welding cycle occurs when storage capacitor 46 reaches the selected voltage, there will be a gradual drop in voltage due to leakage. This drop in voltage will cause a drop in voltage across capacitor 112, which always has a constant percentage of the storage capacitor voltage impressed across it for any particular setting of potentiometer 108. Since, in the absence of further circuitry, the voltage across capacitor 112 thereby would drop below the peak point voltage of the unijunction transistor, unijunction transistor 58 would not fire and silicon controlled rectifier 60 would not conduct. To keep relay 116 energized, it is necessary for silicon controlled rectifier 60 to be turned on every half cycle, since when the voltage supplied by rectifier 48 drops to zero at the end of very half cycle, silicon controlled rectifier 60 ceases to conduct. A capacitor 122 keeps relay 116 energized during the part of each half cycle during which silicon controlled rectifier 60 does not conduct. If unijunction transistor 50 does not fire, as will be the case when the voltage across capacitor 112 drops below its peak point voltage, relay 116 will be deenergized so that points 56 will close. Charging then will re-occur until the voltage across storage capacitor 46 rises to its desired value. The drop in voltage due to leakage is small, amounting typically to approximately 1 to 2 volts as a practical matter, before relay 116 deenergizes and causes the voltage to return to its preset value. This amount of voltage drop is negligible from a welding standpoint.

Typical values of the various components are as follows:

| | |
|---|---|
| Capacitor 122 | 50 mfd. |
| Capacitor 102 | 10 mfd. |
| Capacitor 46 | Sufficiently large capacity for welding selected stud. |
| Capacitor 112 | 0.1 mfd. |
| Resistor 114 | 68 ohms. |
| Resistor 100 | 11,000 ohms. |
| Resistor 54 | 4 ohms. |
| Resistor 120 | 470 ohms. |
| Resistor 110 | 0 to 10,000 ohm potentiometer. |
| Potentiometer 108 | 0 to 50,000 ohm potentiometer. |
| Resistor 106 | 47,000 ohms. |
| Resistor 79 | 10 ohms. |

In operation first the welding voltage is selected by adjusting potentiometer 108. Full wave rectification by bridge 48 generates a D.C. voltage by which storage capacitor 46 is charged. At a predetermined voltage level of capacitor 46, unijunction transistor 58 fires, causing silicon controlled rectifier to conduct. In consequence relay 116 is energized to open points 56 for the purpose of limiting the stored charge across capacitor 46. Thereafter welding gun 20 is directed manually toward work 28 in such a way that, with projection 32 in contact with work 28, chuck 30 moves into the gun housing until stop 37 bears against work 28. Next trigger 53 is closed to energize relay 51 and to change single pole-double throw switch 52 from charge to discharge position. Manual closing of an on-off switch 40 is accompanied by opening of normally closed switch 47, removing discharging resistor 49 from across storage capacitor 46.

The illustrated embodiment thus constitutes a novel stud welding system of unusual simplicity and few components for effectively permitting adjustment of welding voltage, rendering this voltage independent of power supply fluctuations and rapidly recharging of the storage capacitor to operating level after discharge. Since certain changes may be made in the above system without departing from the scope of the invention herein involved, it is intended that all matter contained in the above description or shown in the accompanying drawing shall be interpreted in an illustrative and not in a limiting sense.

What is claimed is:

1. For use in monitoring and controlling a welding apparatus comprising a stud holder for positioning a stud with respect to a workpiece to which the stud is to be welded, a transformer for applied alternating current, a full wave rectifier energized by said transformer, a storage capacitor and a switch operatively connected in series across said rectifier, the improved monitoring and controlling circuit comprising a resistor operatively connected in parallel with said capacitor, said resistor being associated with a timing capacitor, a unijunction transistor having a pair of bases and an emitter closer to one base than to the other, said unijunction transistor being non-conducive until greater than a predetermined voltage is applied to its emitter, said unijunction transistor generating a pulse across its terminal electrodes when greater than a predetermined voltage is applied to its emitter, said emitter being coupled to said resistor, a zener diode for maintaining a constant voltage across said bases, said zener diode being resistively coupled to one of said bases, a gating rectifier including a pair of terminal electrodes and a control electrode, said terminal electrodes being non-conductive until a voltage in excess of a predetermined value is applied to said control electrode, said control electrode being operatively connected to the other base of said unijunction transistor, and a relay operatively connected to one of the terminal electrodes of said gating rectifier for interrupting the operative connection between said full wave rectifier and said capacitor when said gating rectifier is conducting, said resistor and timing capacitor constituting a transient loop which applies said predetermined voltage to said emitter of said unijunction transistor to cause firing when said storage capacitor is predeterminedly charged, said unijunction transistor applying a pulse to said control electrode of said silicon controlled rectifier to cause firing when said unijunction transistor fires, said silicon controlled rectifier becoming conductive when fired in order to apply current to a relay for opening the circuit charging said storage capacitor, said unijunction transistor isolating said storage capacitor from the remainder of said monitoring and controlling circuit, said monitoring and controlling system permitting discharge from said storage capacitor through said stud and workpiece when said storage capacitor is fully charged.

2. The welding apparatus of claim 1 wherein said resistor operatively connected across said storage capacitor is variable in order to permit adjustment of the maximum charge across said storage capacitor.

3. The welding apparatus of claim 2 wherein said resistor includes a potentiometer, said emitter being connected to the movable terminal of said potentiometer.

4. The welding apparatus of claim 1 wherein said resistor operatively connected across said storage capacitor include a potentiometer, said emitter being connected to the movable terminal of said potentiometer.

5. The welding apparatus of claim 1 wherein a Thyrector diode is operatively connected across said full wave rectifier in order to filter out high voltage transients from said applied alternating current.

References Cited by the Examiner
UNITED STATES PATENTS

| | | | |
|---|---|---|---|
| 2,250,102 | 7/1941 | Klemperer | 219—113 X |
| 2,998,561 | 8/1961 | Rockafellow | 219—113 X |
| 3,171,011 | 2/1965 | English | 219—98 |

ANTHONY BARTIS, *Primary Examiner.*

RICHARD M. WOOD, *Examiner.*

R. F. STAUBLY, *Assistant Examiner.*